June 23, 1970  W. FRIEDRICH  3,516,592
COLLAPSIBLE TRANSPORT BOX
Filed April 18, 1968  12 Sheets-Sheet 11
Fig. 23
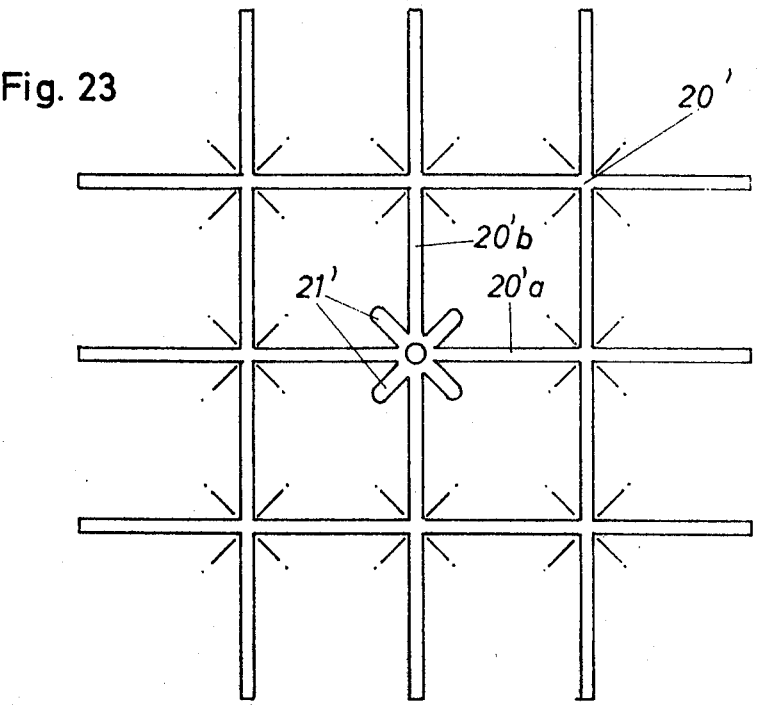
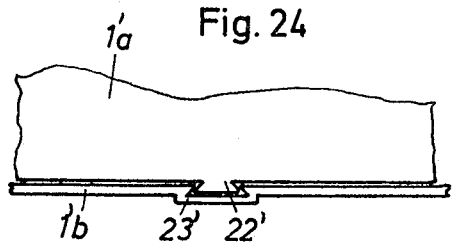
Fig. 24
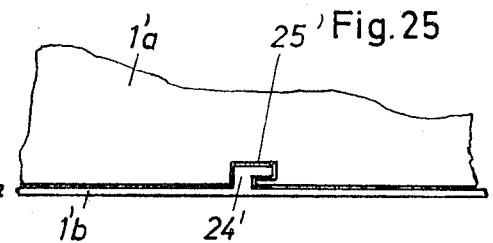
Fig. 25
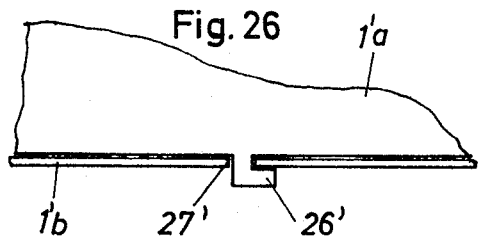
Fig. 26
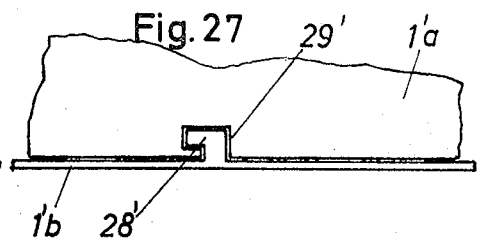
Fig. 27
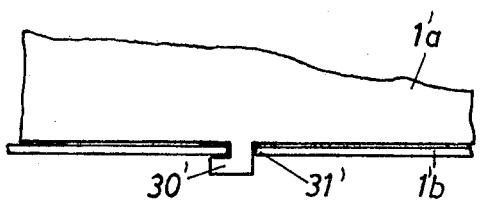
Fig. 28
INVENTOR
WOLFGANG FRIEDRICH
BY
Lowry, Rinehart & Markva
ATTYS.

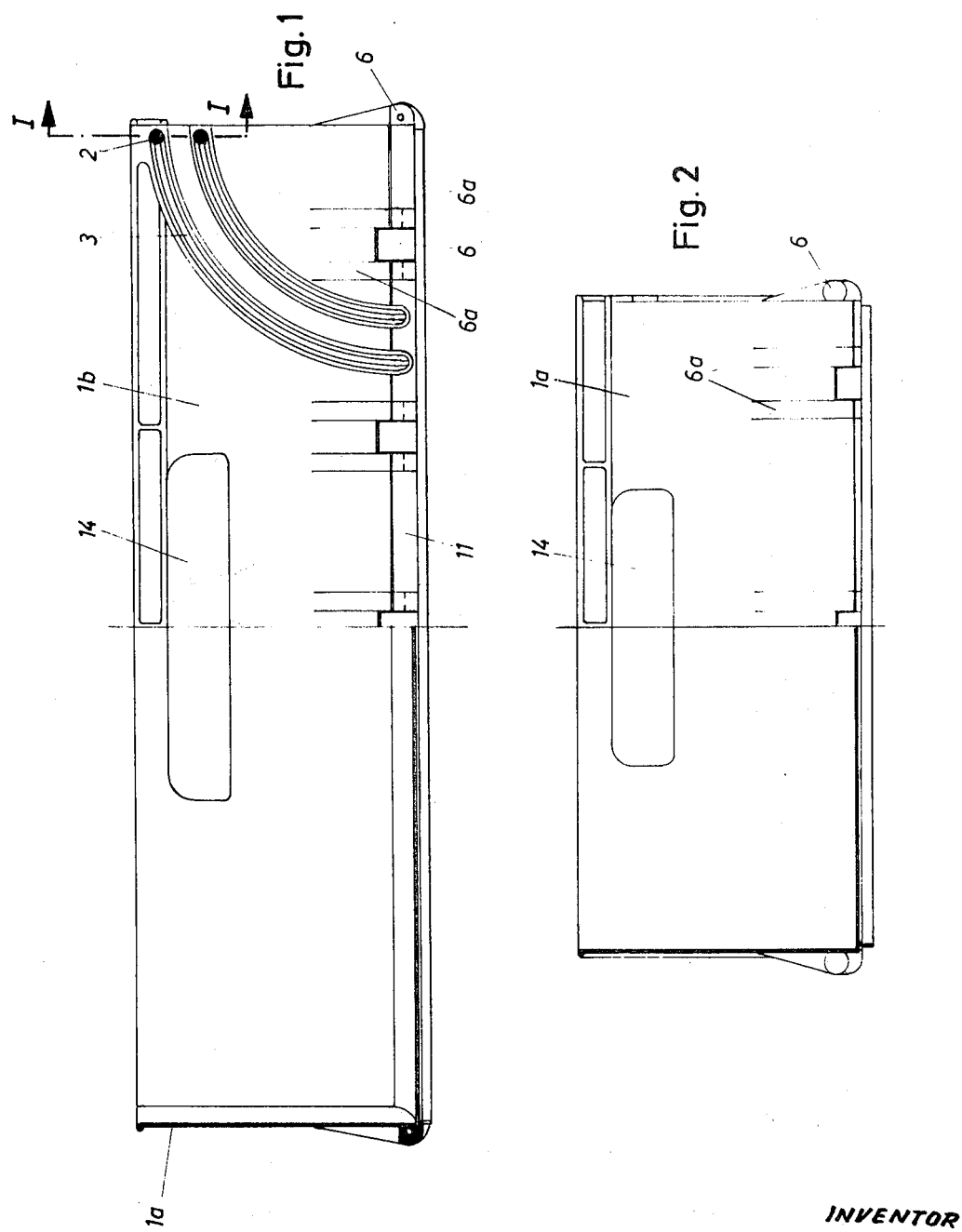

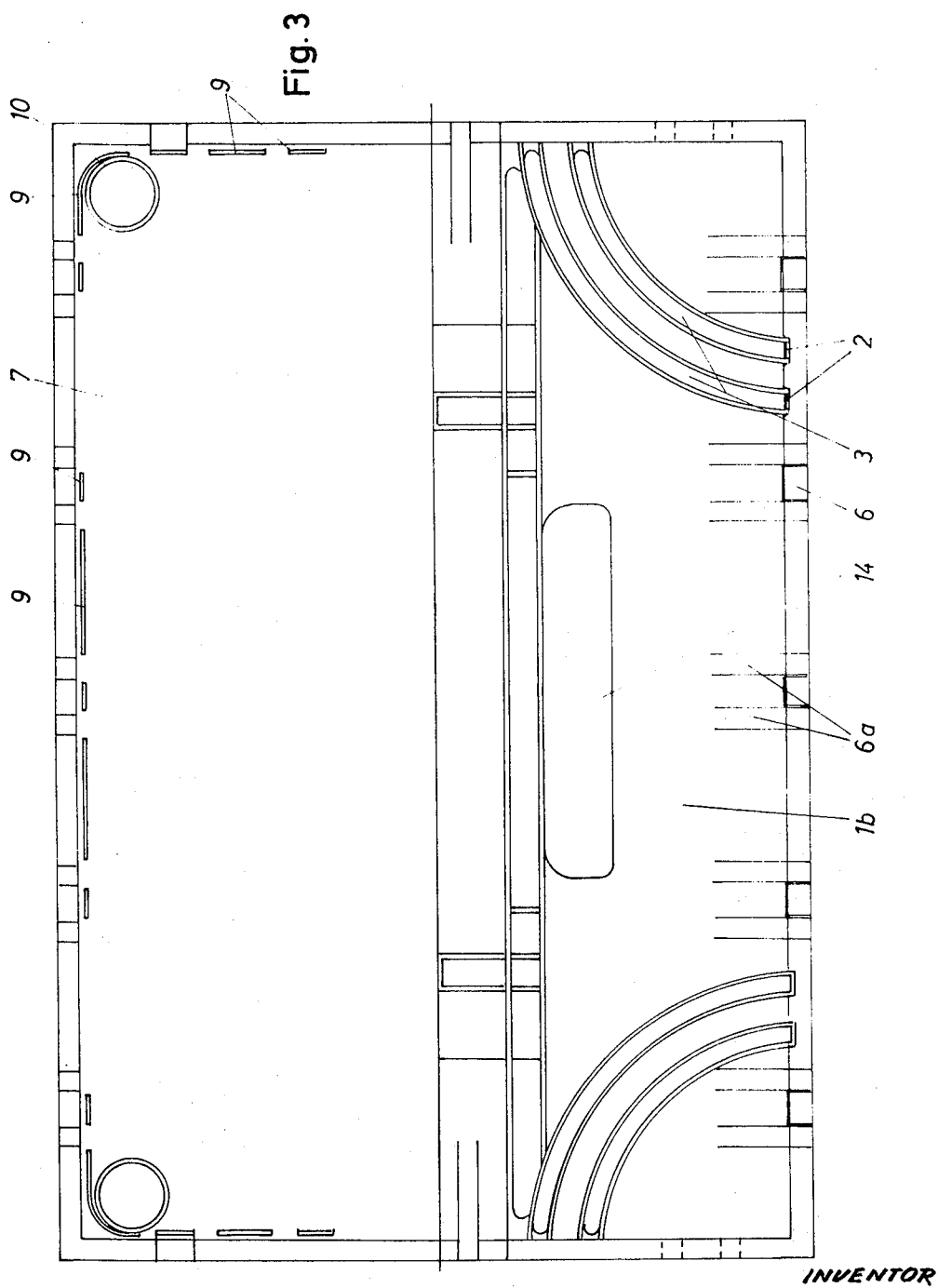

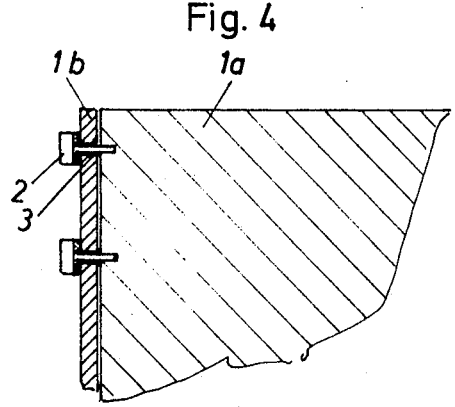
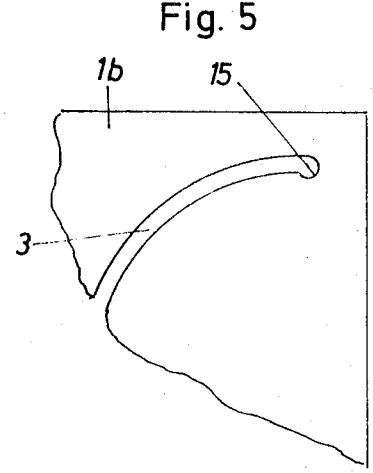
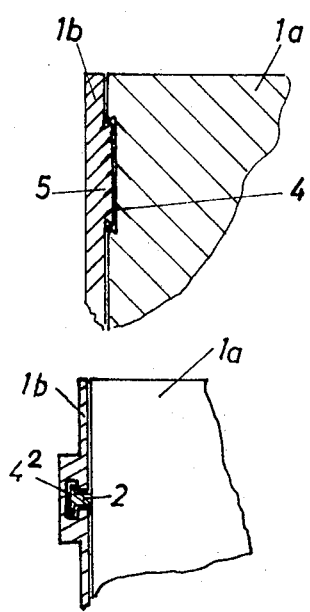
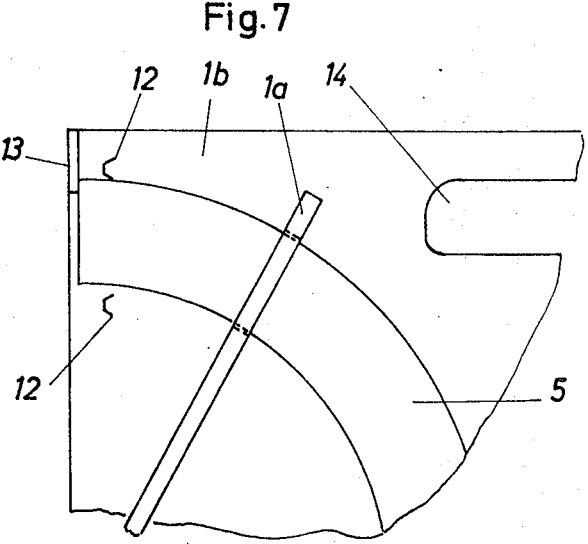

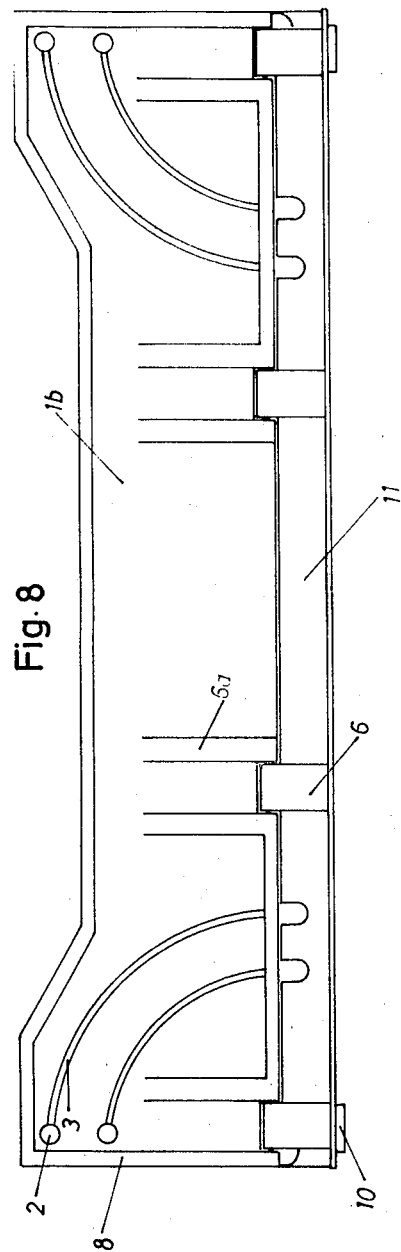
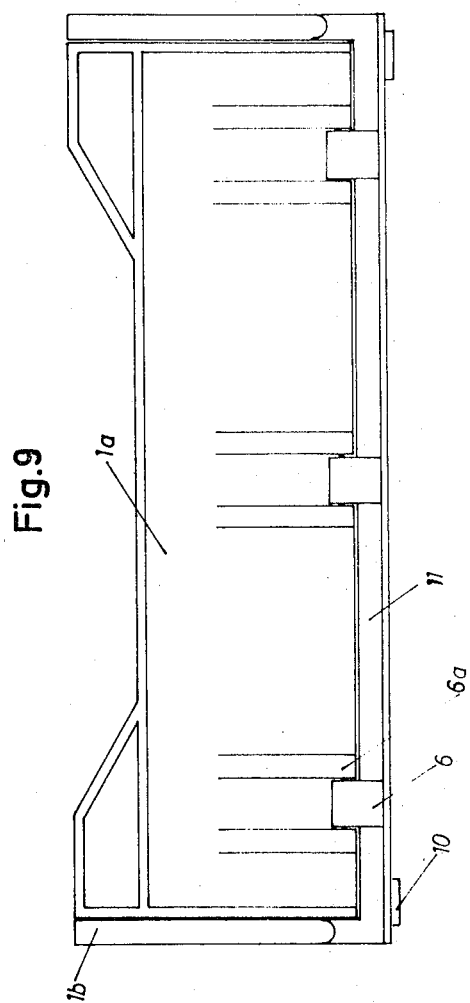

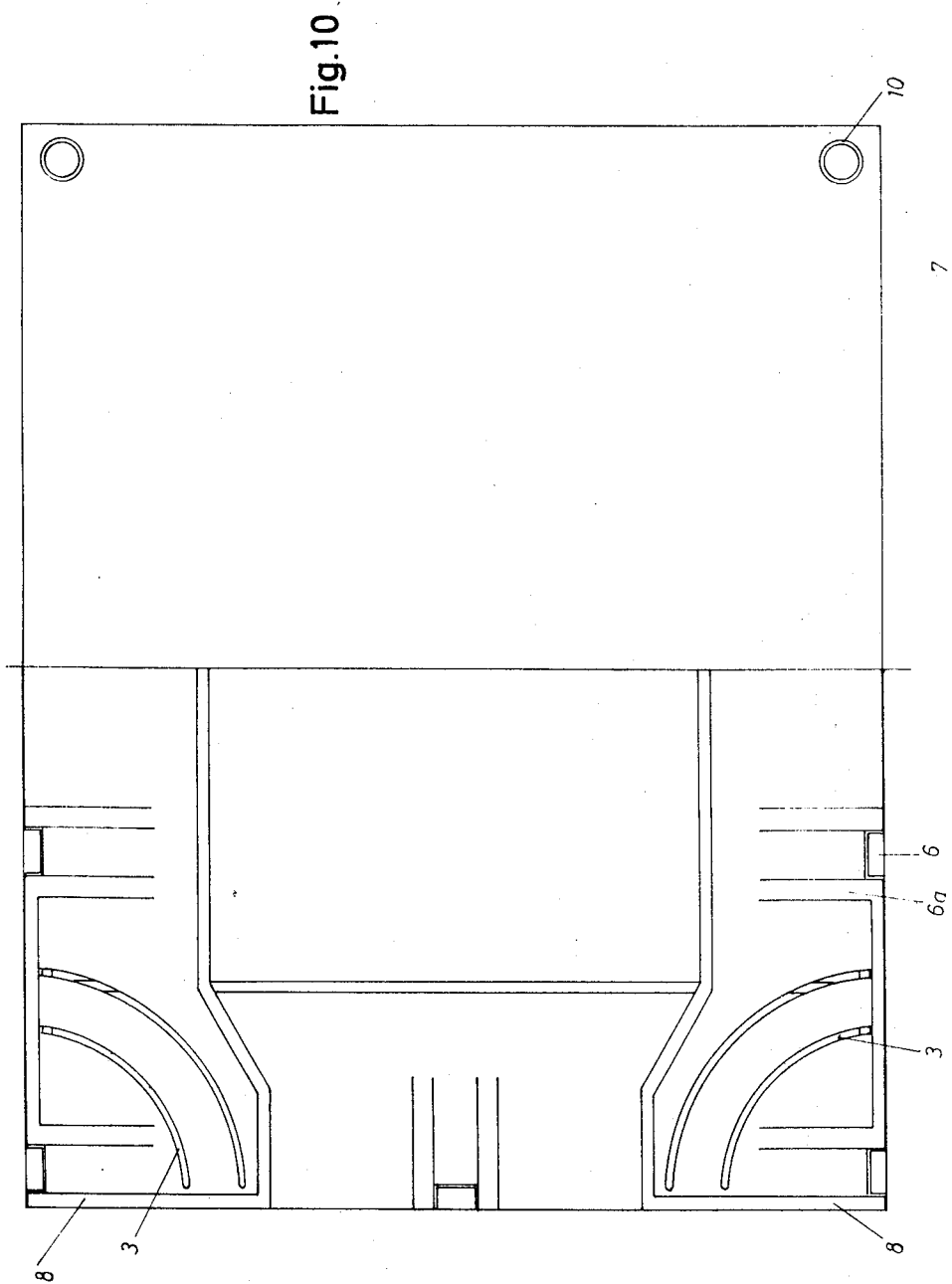

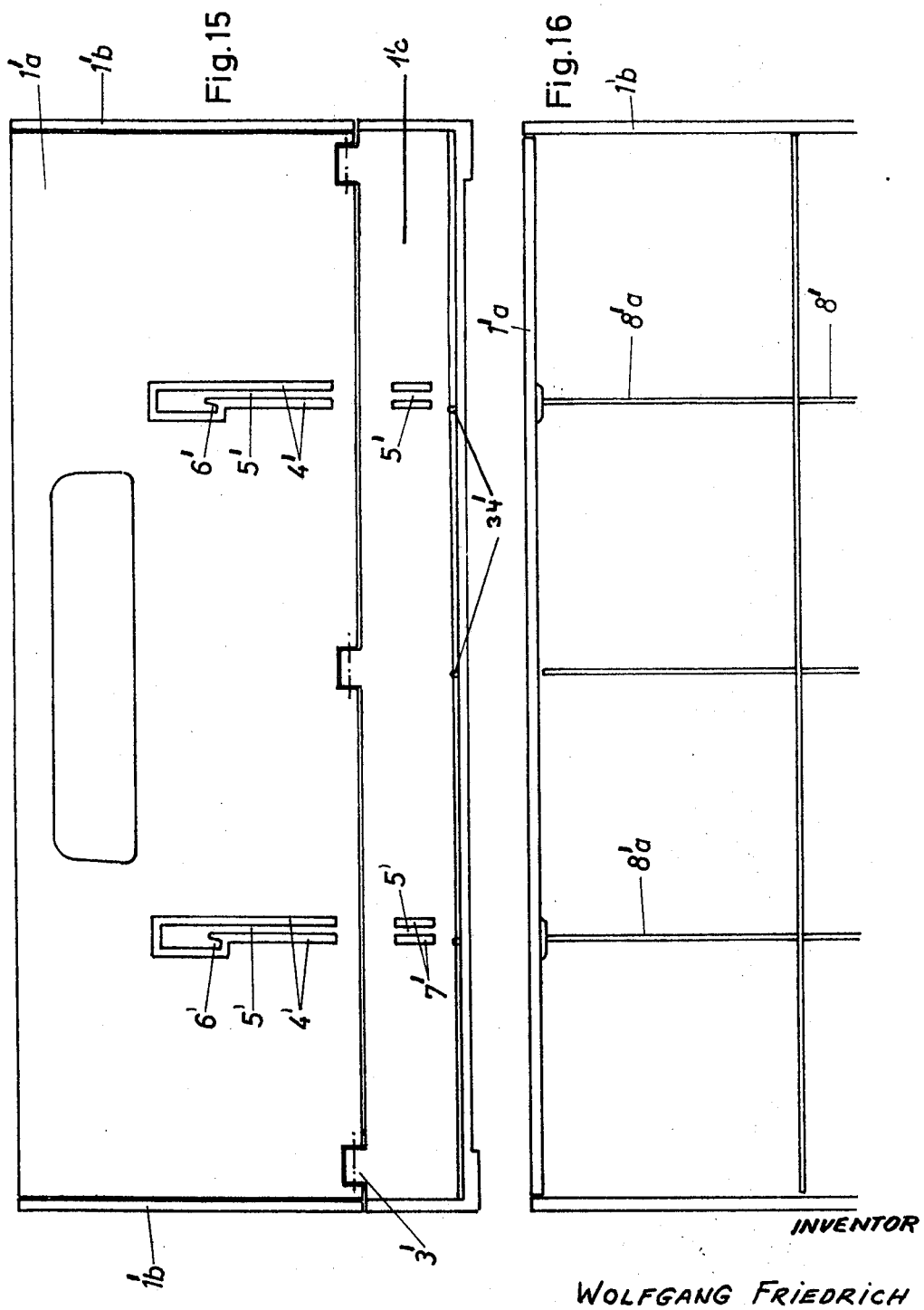

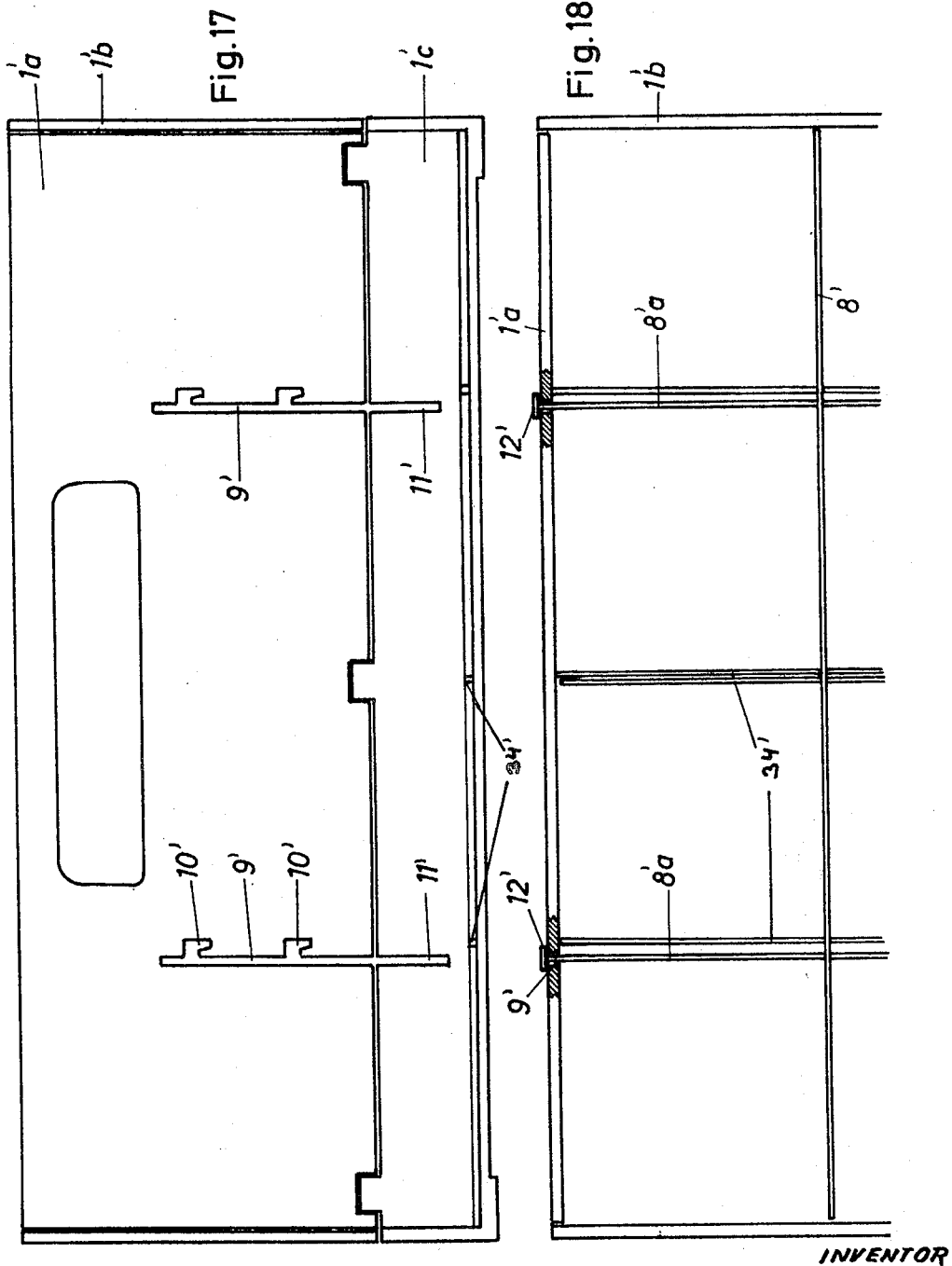

June 23, 1970 W. FRIEDRICH 3,516,592
COLLAPSIBLE TRANSPORT BOX
Filed April 18, 1968 12 Sheets-Sheet 12

INVENTOR
WOLFGANG FRIEDRICH
By
Lowry, Rinehart & Marka
ATTYS.

United States Patent Office 3,516,592
Patented June 23, 1970

3,516,592
COLLAPSIBLE TRANSPORT BOX
Wolfgang Friedrich, 31 Bieberkamp,
Lendringsen, Germany
Filed Apr. 18, 1968, Ser. No. 722,406
Claims priority, application Germany, Apr. 19, 1967,
F 52,173
Int. Cl. B65d 7/24
U.S. Cl. 220—7                                                      5 Claims

ABSTRACT OF THE DISCLOSURE

A transportable collapsible container consisting of a rectangular base and four walls hinged to the base along the edges thereof. One pair of walls is formed with arcuate circular-segmental guide formations centered upon the respective hinges of the other walls and extending through substantially 90° while these other walls have formations engaging the guides in all positions thereof. The guides are provided at their upper ends with notches or formations for retaining the walls in an erected state. The walls carrying the formations are formed with reinforcing ribs extending parallel to the hinged sides over substantially the entire length thereof, the arcuate guide formations extending into the ribs.

---

To save space in the transport of empty containers, particularly of transport boxes, it is known to use collapsible boxes since such boxes provide economical transport conditions.

The present invention provides a collapsible transport box, which comprises a bottom, a first and a second pair of inwardly tiltable opposite side walls, hinge means between said bottom and said side walls, and means for guiding and joining said pairs of opposite side walls with each other.

Such a box is particularly convenient when transporting fruit and vegetables.

In a useful embodiment of the present invention the collapsible transport box comprises at least one lateral cylindrical guide body on one of said pairs and circular curved guide grooves in the other pair for cooperatively guiding and joining said pairs of opposite side walls.

In another useful embodiment of the present invention the arrangement may be such that dove-tailed recesses in one pair of opposite side walls are arranged to be guided on circular curved ledges secured to or formed integral with the adjacent side walls of the other pair of opposite side walls.

The hinge means between the bottom and the side walls may be formed integral with the bottom and the side walls.

According to a further feature of the present invention, raised webs may be formed integral with the underside of the bottom to engage behind the side walls when erected boxes are being piled on each other, and to engage between hinge strips when collapsed boxes are being piled on each other so that the boxes lie on each other without being able to displace with relation to each other.

The collapsible transport boxes proposed by the invention are preferably made of plastics material.

In a further advantageous embodiment of the invention a latticework may be inserted and displaceably but not removably attached to two opposite side walls.

The latticework may be guided either in a slot formed between two ledges provided on two opposite side walls or in slots in said side walls, guiding and holding bodies being formed integral with the guide strips of the latticework. In the latter case the guided webs of the latticework are formed with guiding and holding bodies.

According to a further feature of the present invention, the latticework is lockable on different levels.

The aforementioned aspect of the present invention has for its object to provide a collapsible box which can be used for the transport of bottles and glasses. The displaceable latticework permits the reception of bottles having different sizes.

The present invention further comprises all described, illustrated and claimed features.

Several embodiments of the invention will now be described by way of example and with reference to the accompanying drawings, in which:

FIG. 1 is a side elevational view of a box for transport having guide grooves;

FIG. 2 is a side elevational view of the adjacent side wall according to FIG. 1;

FIG. 3 is a fractional top plan view of a collapsed transport box and a bottom view according to FIGS. 1 and 2;

FIG. 4 is a section taken on the line IV—IV in FIG. 1;

FIG. 5 is a side elevational view showing a detail of the guide groove;

FIG. 6 is a section through a guide having a ledge and a recess;

FIG. 6a is a section of a T-shaped guide in correspondence with FIG. 6;

FIG. 7 is a side elevational view according to FIG. 6;

FIG. 8 is a side elevational view of a further embodiment of the invention;

FIG. 9 is a side elevational view of another side wall of the embodiment according to FIG. 8;

FIG. 10 is a top plan view of a fraction of the box according to FIGS. 8 and 9 and a corresponding partial bottom view;

FIG. 15 is an internal view of a side wall provided with guide strips for a partition member;

FIG. 16 is a top plan view of a box for transport according to FIG. 2 including an inserted partition member;

FIG. 17 is an internal view of a side wall including a guide slot;

FIG. 18 is a top plan view according to FIG. 17 including an inserted partition member;

FIG. 23 is a top plan view of a single partition member comprising webs extending to the center;

FIGS. 24 to 28 are elevational views illustrating further embodiments for the connection and guide of adjacent side walls.

Figure 11:
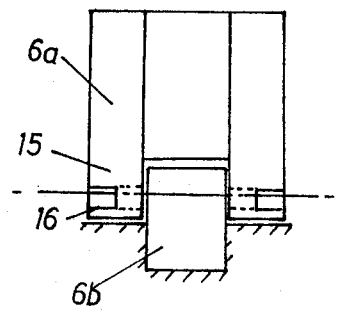
FIGS. 11 to 14 are views illustrating the design of a hinge.

In the drawings, the collapsible transport box comprises two pairs of opposed side walls 1a and 1b and a bottom 7. In the embodiment shown in FIGS. 1 and 2, circular curved grooves 3 are provided in the side walls 1b. One or more cylindrical guide bodies 2 are laterally secured to the adjacent side wall 1a and are guided in said grooves 3. The arrangement of the cylindrical guide bodies 2 will be apparent from FIG. 4. The side walls 1a and 1b are connected to the bottom 7 by means of hinges 6 the component parts of which are integrally formed with the side walls 1a and 1b and with the bottom 7, respectively.

As can be seen from FIGS. 8 and 9, reinforcement ribs at the ends of the side walls 1a and 1b serve as hinge strips 6a. Other ribs may serve to reinforce the side walls. A recess 14 in the side walls 1a and 1b serves as a carrying handle and imparts further strength to the collapsible transport box proposed by the invention.

Integrally formed with the bottom 7 are webs 9 (FIG. 3) which, when a plurality of erected boxes are piled on each other, engage behind the side walls 1a and 1b, and which, when a plurality of collapsed boxes are piled on each other, engage between the hinge strips 6a so that the boxes cannot displace in piled condition. The same function is accomplished by rings 10 which may likewise be integrally formed with the underside of the bottom 7. When piling erected boxes, the rings 10 engage in the corners defined by two adjacent side walls 1a and 1b, and when piling collapsed boxes the rings 10 engage between the hinge strips 6a of the hinges on the sides of the side walls 1a and 1b.

A further embodiment of the guide and the connection of the side walls 1a and 1b is illustrated in FIGS. 6 and 7, a circular curved ledge 5 being attached to or integrally formed with the side wall 1b. The side wall 1a is guided on said ledge 5 by means of a correspondingly shaped recess 4. To limit the movement of the side walls 1a a stop 13 is provided at the end of the side wall 1b as shown in FIG. 7. Cams 12 over which the side wall 1a may be shifted under slight pressure, prevent unintentional tilting of the side walls 1a towards the inside. Positive tilting of the side walls towards the inside may be achieved by an enlarged portion 15 of the guide provided by the grooves 3, as shown in FIG. 5. The cylindrical guide bodies 2 engage in the enlarged portions 15.

In the embodiment shown in FIGS. 8 and 9 the bottom carries an upstanding rim portion 11 which serves to prevent any fruit juice from flowing out of the box during transport. When dry goods are to be transported, such a circumferential upstanding rim portion is not necessary. Therefore, in the embodiment according to FIGS. 1 and 2 only the side walls 1b have an upstanding rim portion 11. Thus, the height of the collapsed box is smaller than the height in the case of boxes having a circumferential rim portion 11 on the bottom member 7. For the rest, the collapsible box shown in FIGS. 8 and 9 is identical with the embodiment according to FIGS. 1 and 2. Merely the shape of the side walls and the reinforcements are slightly modified.

The transport box proposed by the invention is preferably made of plastics material.

FIG. 6a shows another modified form of guide and connection of the side walls 1a and 1b, in which the cylindrical guide bodies 2, which are secured to both sides of one side wall 1a, are guided in T-shaped recesses $4^2$ in the adjacent side walls 1b. This arrangement is advantageous insofar as no openings are provided in the side walls 1b. Thus, the guide is not visible from the outside.

Figure 12:
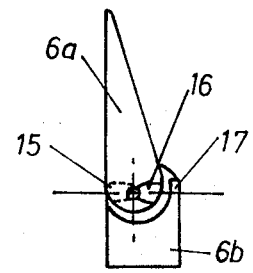

FIGS. 11 and 12 show a hinge of the type used in boxes proposed by the invention. The hinge strips 6a are provided with offset cylindrical recesses which are obtained by inserting cylindrical cores during casting. Thereby, the guides for the hinge pins are obtained without bores having to be provided. Integrally formed with the central member of the hinge 6 may be a stop 17 which prevents the side walls 1a or 1b from tilting outwardly.

Figure 13:
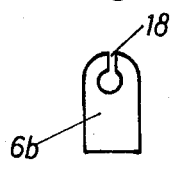
Figure 14:
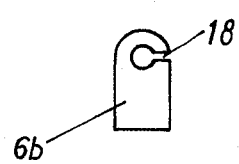
Figure 19:
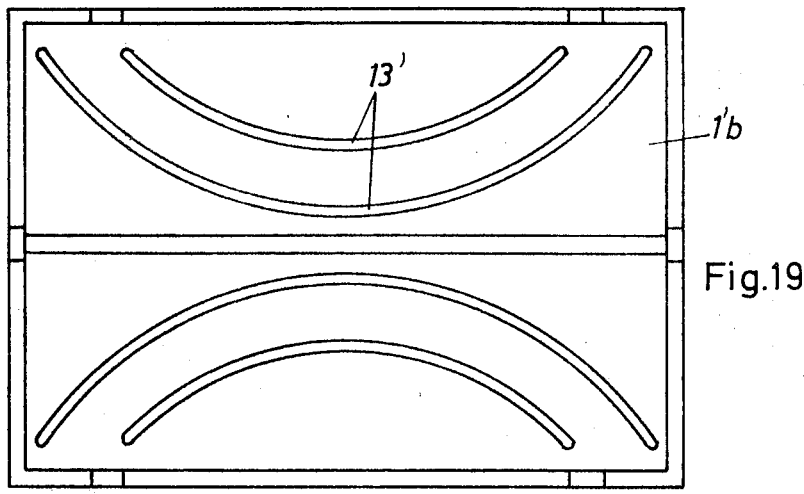
FIGS. 19, 20, 21a and 21b are elevational views of side walls allowing economical expenditure of production material.
Figure 20:
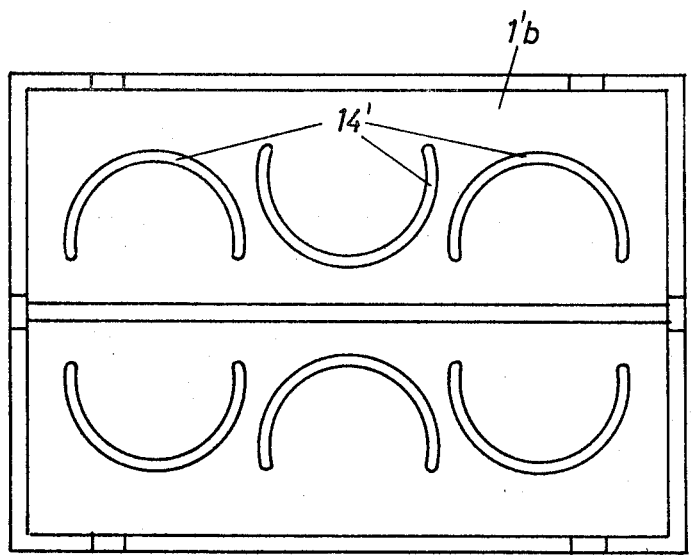
Figure 21A:
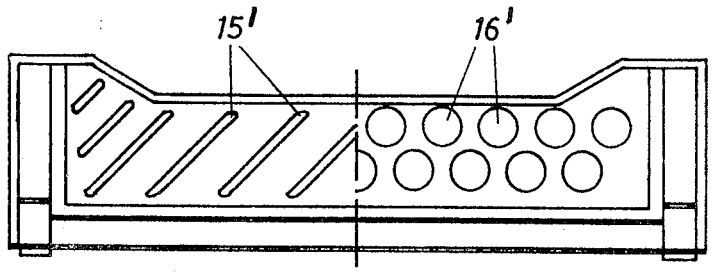
Figure 21B:
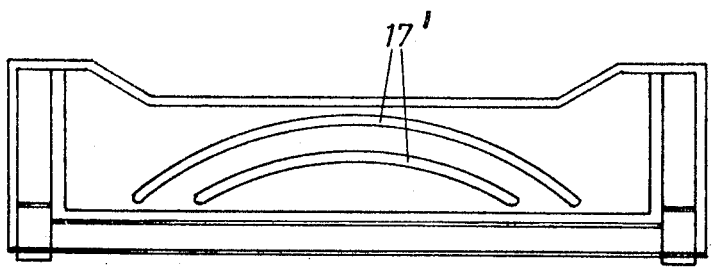

FIGS. 13 and 14 show central hinge members 6b which are used particularly with boxes made of plastics material. This central hinge member 6b is provided either with upwardly or with laterally directed slots 18. For each side wall central hinge members 6b with upwardly and laterally directed slots 18 are used. For mounting the side walls 1a or 1b, a hinge pin is introduced into the hinge strips 6a, then the side wall is inserted with its hinge pins into the upwardly directed slots 18 of the central hinge members 6b, and by slight bending the side walls of plastics material, the hinge pins can be inserted into the laterally directed slots 18 of the other central hinge members 6b. In this manner, the side walls are held in vertical direction by one part of the central hinge members 6b and in lateral direction by the other part of the central hinge members. The hinge pins consist of slightly bent spring wires.

As shown in FIG. 15, ledges $4^1$ defining a slot $5^1$ are attached to a side wall $1^1a$. A similar arrangement is provided on the opposite side wall. The bottom $1^1c$ likewise is box-shaped and carries ledges $7^1$ defining a slot $5^1$ below ledges $4^1$ which are secured to the side walls. As can be seen from FIG. 16, these provisions have been made to allow the accommodation of a latticework $8^1$ consisting of crossing strips, two strips $8^1a$ being provided for guiding purposes. The latticework $8^1$ is located in the box-shaped bottom $1^1c$ when the box is in its collapsed condition, the height of the strips therefore may not be greater than the height of the box-shaped bottom member $1^1c$ is. Together with its guide strips $8^1a$ the complete latticework $8^1$ can be displaced in vertical direction in the slots $5^1$ when the transport box is erected. Locking of the latticework is obtained by lateral displacement of the guide strips $8^1a$ in catch chambers $6^1$ provided for this purpose. The guide means in this figure is designated by the reference numeral $2^1$, whereas the hinges are designated by the numeral $3^1$.

An alternative form of guiding the displaceable partition member $8^1$ is shown in FIGS. 17 and 18. In this case, the opposite side walls $1^1a$ are provided with slots $9^1$. These slots $9^1$ are continued by slots $11^1$ in the upstanding rim portions of the bottom member $1^1c$ located therebelow. For guiding the latticework $8^1$, the guide strips $8^1a$ are extended such that they project through the slots $9^1$ and $11^1$, respectively. Guiding or holding bodies $12^1$ are formed integral with the ends of the guide strips $8^1a$ to guide and hold the latticework $8^1$. Again, catch chambers $10^1$ are provided to lock the latticework $8^1$ on different levels. Since engagement is obtained by lateral displacement of the latticework $8^1$, the transverse strips must be shorter than the inner width of the box is.

To save material and possibly to increase the strength of the side walls $1^1a$ and $1^1b$, recesses in the form of circular curves $13^1$ and $17^1$, half-rings $14^1$, inclined strips $15^1$ and circular holes $16^1$ may be provided as shown in FIGS. 19, 20, 21a and 21b.

Figure 22:
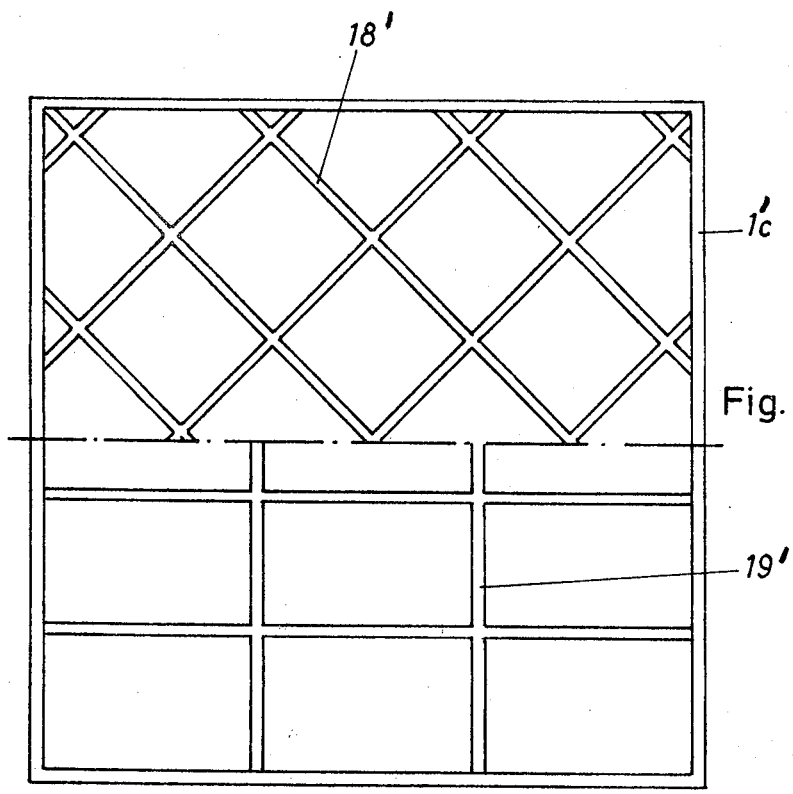
FIG. 22 is an elevational view of a bottom member allowing economical expenditure of production material.

FIG. 22 shows an embodiment of the bottom member $1^1c$ in which likewise for the purpose of saving material the bottom is formed of diagonal strips $18^1$ or transverse strips $19^1$.

A particularly advantageous partition member $20^1$ is shown in FIG. 23. Strips $21^1$ projecting towards a center are arranged in a known manner in the area of the corners defined by webs $20^1a$ and $20^1b$ crossing each other. These strips $21^1$ hold inserted bottles in a particularly favorable manner and prevent their labels from being damaged.

In addition to the holding and guiding means of the adjacent side walls $1^1a$ and $1^1b$, FIGS. 24 to 28 show technically equivalent alternative embodiments. FIG. 24 shows that one or more dove-tailed guide bodies $22^1$ are formed integral with the side wall $1^1a$, which bodies extend into dove-tailed guide grooves $23^1$ in the adjacent side wall $1^1b$. Further, an embodiment as shown in FIGS. 25 and 27 is possible, in which guide strips $24^1$ and $28^1$ respectively of hook-shaped cross section are attached to one side wall. The adjacent side walls $1^1a$ having identical recesses are displaceable on said strips $24^1$ or $28^1$. The embodiments described in the foregoing serve to provide side walls that are not perforated.

If the side walls are allowed to be perforated, one form of connection between both side walls $1^1a$ and $1^1b$ is obtained in that hook-shaped guide bodies $26^1$ or $30^1$ according to FIGS. 26 and 28 project through guide slots $27^1$ or $31^1$ in the side walls $1^1b$, the upwardly or downwardly bent portion of the guide body providing the connection.

Figure 29:
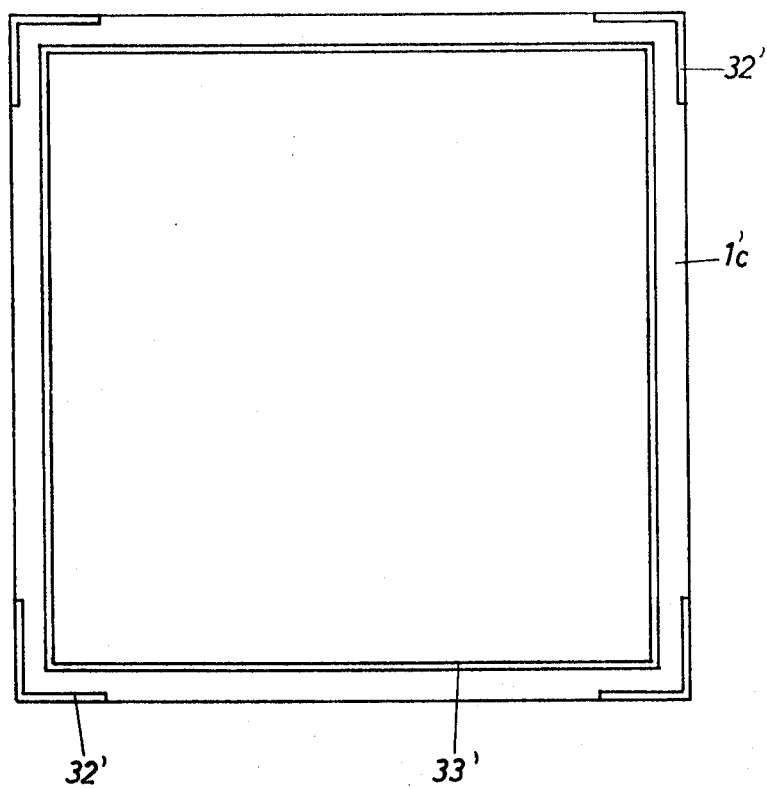
FIG. 29 is a bottom view of the bottom member of a transport box according to the invention.

In FIG. 29 the four corners of the bottom member $1^1c$ are each provided with a raised corner member $32^1$. When piling filled transport boxes the corner members 32¹ embrace the side walls 1¹a and 1¹b of the box located therebelow and thus prevent the side walls thereof from being pressed outwardly under great pressure. Further, a circumferential piling or stacking edge 33¹ secures the superimposed filled boxes against displacement and simultaneously serves as a support for each box when standing on the floor.

In FIGS. 15 and 17 a slightly raised latticework 34¹ of a construction similar to that of the displaceable latticework 8¹ is formed integral with the inside of the bottom member 1¹c to prevent glasses or bottles from colliding.

The transport box proposed by the invention can be easily collapsed due to the good lateral guides and is nevertheless very stable in erected condition. By a suitable choice of the guides of the hinges, a very small piling height is obtained if the boxes are collapsed.

By the engagement of the strips and rings on the bottom between the hinge strips and in the corners of the adjacent side walls, the boxes form a stable unit when being piled. The individual boxes in said unit are not able to displace with respect to each other which is a particular advantage.

The displaceable latticework further ensures that the proposed transport box can also be used for the accommodation of bottles and glasses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A collapsible transport container comprising a flat rectangular base, a first pair of flat rectangular walls respectively hinged to said base along a pair of opposite first edges thereof, a second pair of flat rectangular walls respectively hinged to said base along the other edges thereof, said first pair of walls each being provided along its inner surface with a pair of circularly arcuate guide formations extending over about 90° at each end of the wall and centered on the hinged axis of the respective other edge, and respective member on opposite edges of the walls of said second pair remote from the respective hinged edges and engaging the corresponding guide formations in all positions of said walls, said walls of said first pair being further provided with reinforcing ribs along their hinged edges and said formations extending into said ribs, said formations each being provided remote from said ribs with indexing means engageable with said members for retaining said walls in an erected position substantially perpendicular to said base.

2. The container defined in claim 1, further comprising means including said formations and said members for releasably locking said members at a plurality of positions along said formations.

3. The container defined in claim 1 wherein said formations of a respective arcuate slot formed in the walls of said first pair and said members are projections received in said slot.

4. The container defined in claim 3 wherein two such coaxial slots are provided at each end of the walls of said first pair for co-operating with two such projections on the respective edges of the walls of said second pair.

5. The container defined in claim 3 wherein said projections are hook-shaped members extending through said slots.

References Cited

UNITED STATES PATENTS

| | | | |
|---|---|---|---|
| 1,371,651 | 3/1921 | Sprague | 220—6 |
| 1,484,789 | 2/1924 | Lackey | 220—6 |
| 1,648,045 | 11/1927 | Eitsert | 220—6 |
| 2,256,928 | 9/1941 | Slack | 220—6 X |
| 2,762,076 | 9/1956 | Kiba. | |
| 2,844,272 | 7/1958 | Mayer | 220—6 |
| 3,254,786 | 6/1966 | Melville | 220—97 X |
| 3,349,289 | 10/1967 | Mueller | 220—62 X |
| 3,360,180 | 12/1967 | Venturi | 220—6 X |
| 3,362,576 | 1/1968 | Beesley | 220—72 |

FOREIGN PATENTS

| | | |
|---|---|---|
| 259,405 | 5/1964 | Australia. |
| 1,423,258 | 11/1965 | France. |
| 892,677 | 3/1962 | Great Britain. |
| 951,792 | 3/1964 | Great Britain. |

GEORGE E. LAWRANCE, Primary Examiner

U.S. Cl. X.R.

220—31, 21, 72